United States Patent
Daggupati et al.

(10) Patent No.: US 11,945,728 B2
(45) Date of Patent: Apr. 2, 2024

(54) PROCESS FOR OBTAINING VANADIUM OXIDE FROM A GASIFIER SLAG FIELD

(71) Applicant: Reliance Industries Limited, Mumbai (IN)

(72) Inventors: Sateesh Daggupati, Khamman (IN); Sachchit Majhi, Jamshedpur (IN); Sukumar Mandal, Faridabad (IN); Asit Kumar Das, Jamnagar (IN); Vipulkumar Rameshbhai Panchotia, Morbi (IN); Mehul Bharatbhai Joshi, Bhavnagar (IN); Gopal Ravichandran, Jamnagar (IN); Praveen Kumar Chinthala, Jamnagar (IN); Swapan Kumar Ghosh, Navi Mumbai (IN); Ajit Vishwanath Sapre, Tampa, FL (US)

(73) Assignee: Reliance Industries Limited, Mumbai (IN)

(*) Notice: Subject to any disclaimer, the term of this patent is extended or adjusted under 35 U.S.C. 154(b) by 813 days.

(21) Appl. No.: 17/044,727

(22) PCT Filed: Apr. 3, 2019

(86) PCT No.: PCT/IB2019/052718
§ 371 (c)(1),
(2) Date: Oct. 1, 2020

(87) PCT Pub. No.: WO2019/193510
PCT Pub. Date: Oct. 10, 2019

(65) Prior Publication Data
US 2021/0017038 A1    Jan. 21, 2021

(30) Foreign Application Priority Data
Apr. 3, 2018 (IN) .............................. 201821012666

(51) Int. Cl.
*C01G 31/02* (2006.01)
*C22B 1/02* (2006.01)
(Continued)

(52) U.S. Cl.
CPC ................ *C01G 31/02* (2013.01); *C22B 1/02* (2013.01); *C22B 1/14* (2013.01); *C22B 3/04* (2013.01);
(Continued)

(58) Field of Classification Search
CPC .. C01G 31/03; C22B 1/02; C22B 1/14; C22B 3/04; C22B 3/22; C22B 3/44; C22B 7/007
(Continued)

(56) References Cited

FOREIGN PATENT DOCUMENTS

| CN | 101445271 A | 6/2009 |
|---|---|---|
| CN | 101215005 B | 8/2011 |

OTHER PUBLICATIONS

Jiang et al., "A Novel Method to Prepare High-purity Vanadium Pentoxide by Chlorination with Anhydrous Aluminum Chloride", Chem. Lett. 2017, 46, 669-671. (Year: 2017).*
(Continued)

*Primary Examiner* — Anita Nassiri-Motlagh
(74) *Attorney, Agent, or Firm* — Osha Bergman Watanabe & Burton LLP

(57) ABSTRACT

A process for obtaining vanadium component in the form of vanadium oxide from gasifier slag is disclosed. The process comprises pulverizing the slag to obtain pulverized slag, which is blended with water and an alkali salt to obtain a slurry. The slurry is dried and then roasted in the presence of air to obtain a roasted slag. The roasted slag is leached to obtain a first filtrate comprising the vanadium component. The first filtrate is reacted with a magnesium salt to remove a silica component in the form of a precipitate. The silica (Continued)

free second filtrate is reacted with an ammonium salt to obtain ammonium metavanadate, which is further calcined to obtain the significant amount of vanadium pentoxide ($V_2O_5$).

16 Claims, 1 Drawing Sheet

(51) Int. Cl.
- *C22B 1/14* (2006.01)
- *C22B 3/04* (2006.01)
- *C22B 3/22* (2006.01)
- *C22B 3/44* (2006.01)
- *C22B 7/00* (2006.01)

(52) U.S. Cl.
CPC .................. *C22B 3/22* (2013.01); *C22B 3/44* (2013.01); *C22B 7/007* (2013.01)

(58) Field of Classification Search
USPC .................................................. 423/594.17
See application file for complete search history.

(56) References Cited

OTHER PUBLICATIONS

CN-101215005-B English translation (Year: 2011).*
CN-101445271-A English translation (Year: 2009).*
International Search Report issued in International Application No. PCT/IB2019/052718 dated Jul. 1, 2019 (2 pages).
Written Opinion issued in International Application No. PCT/IB2019/052718 dated Jul. 1, 2019 (6 pages).

* cited by examiner

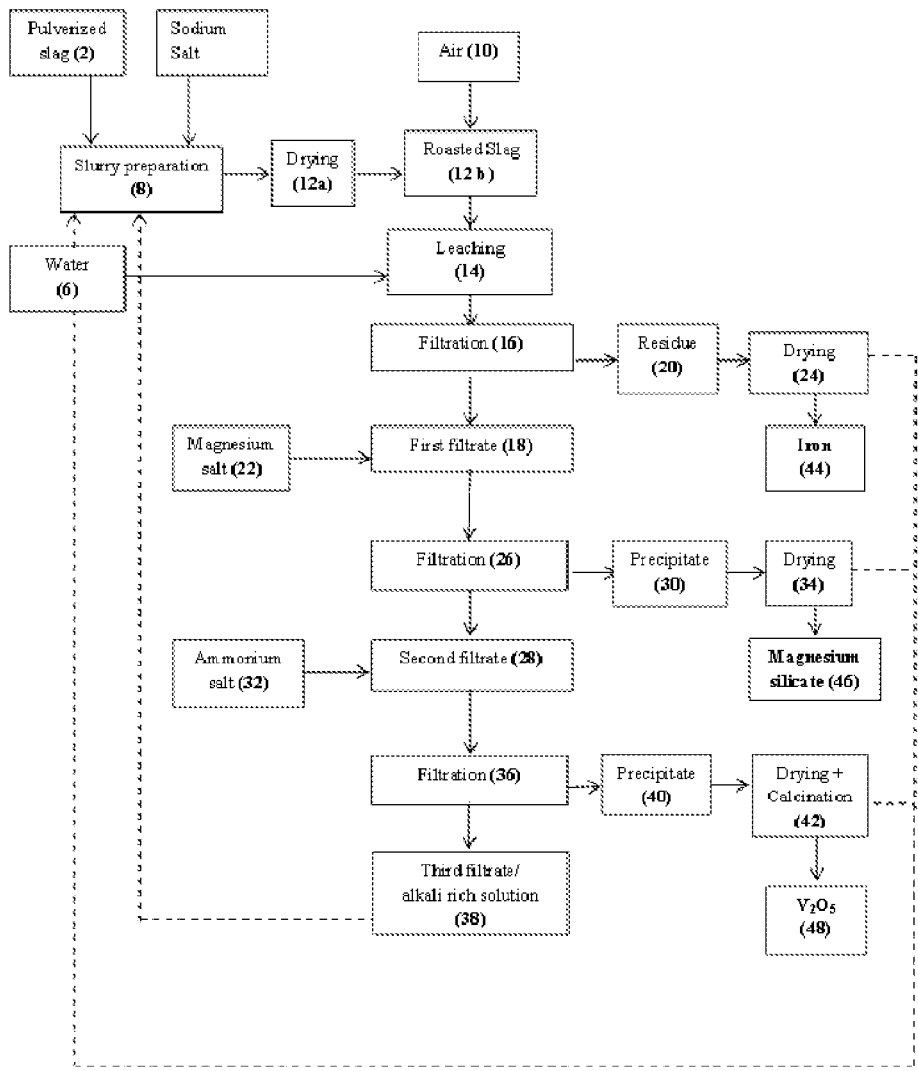

PROCESS FOR OBTAINING VANADIUM OXIDE FROM A GASIFIER SLAG FIELD

FIELD

The present disclosure relates to the field of chemical/metallurgy engineering.

DEFINITIONS

As used in the present disclosure, the following terms are generally intended to have the meaning as set forth below, except to the extent that the context in which they are used to indicate otherwise.

Vanadium component refers to vanadium or a compound thereof.

Silica component refers to silica or a compound thereof.

Calcium component refers to calcium or a compound thereof.

Sulfur component refers to a compound of sulfur.

BACKGROUND

The background information herein below relates to the present disclosure but is not necessarily prior art.

Entrained flow gasifiers operate at a temperature greater than 1400° C., i.e., above fusion temperature of ash, for increasing the carbon conversion efficiency during the gasification of carbonaceous feedstocks such as petcoke, coal and the like. Molten slag generally consist all inorganic content of feed which is produced as a by-product of gasification, which comes out from a gasifier after gasification. It is well known in the art that the molten slag or slag comprises heavy metals, such as 1 to 10 wt. % of vanadium, 1 to 3 wt % of nickel, 1 to 10 wt. % of iron, 10 to 30 wt. % of silica and the like, which have high commercial value. Vanadium is an important by-product, which has application in pharmaceutical products, catalyst as well as other fine chemicals in oxide form.

However, vanadium is not found in its pure state; but occurs in combination with various other minerals such as carnotite, roscoelite, vanadinite, mottramite, patronite and the like. Moreover, gasification slag contains relatively high amount of silica which leads to a glassy structure where vanadium exists in spinel form with other metals such as silica, alumina, iron etc. which causes difficulty in recovery of pure vanadium in oxide form by conventional routes. Though various other extraction technologies from its ore and spent catalyst have been reported in prior art, there is no suitable process for the extraction vanadium in oxide form from the gasification slag and the commercial scale extraction of vanadium from the gasification slag has not yet practiced across the globe. The conventional feed (vanadium ore, spent catalyst) is entirely different from gasification slag in which vanadium to silica ratio is ~1; whereas it is ~0.2 in case of gasification slag which severely hampers the product purity during the extraction of vanadium by the conventional techniques.

There is, therefore, felt a need for a process to extract vanadium in the form of oxide from the gasifier slag.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a process for the extraction of vanadium in oxide form from gasifier slag comprising vanadium component.

Another object of the present disclosure is to provide a process for the extraction of vanadium in oxide form ($V2O_5$) from gasifier slag with high purity.

Yet another object of the present disclosure is to provide a process for the extraction of iron component from gasifier slag.

Still another object of the present disclosure is to provide a process for the extraction of silica component from gasifier slag.

Other objects and advantages of the present disclosure will be more apparent from the following description, which is not intended to limit the scope of the present disclosure.

SUMMARY

The present disclosure provides a process for obtaining vanadium oxide from a gasifier slag. The process comprising the following steps:

Initially, the gasifier slag is pulvarized to a particle size less than 100 μm to obtain a pulverized slag. The pulverized slag is blended with water and at least one alkali salt to obtain a slurry. The slurry is dried to remove water and then the dried slurry is roasted in the presence of air and at a temperature in the range of 750° C. to 1000° C. to obtain a roasted slag. The roasted slag is further leached with water to obtain a first filtrate comprising the vanadium component and a residue comprising iron component. The residue is dried and subjected to magnetic separation to obtain iron component.

A silica component is separated from the first filtrate to obtain a silica free second filtrate comprising vanadium component ad which is substantially free of silica component and a magnesium silicate in the form of a precipitate. Magnesium silicate is separated by filtration.

The silica free second filtrate is reacted with an ammonium salt to obtain ammonium metavanadate in the form of a precipitate Ammonium metavanadate is separated by filtration and calcined at a temperature in the range of 400 to 600° C. to obtain vanadium oxide having purity greater than 95%.

BRIEF DESCRIPTION OF THE ACCOMPANYING DRAWING

The present disclosure will now be described with the help of the accompanying drawing, in which:

FIG. 1 depicts a flowchart for the process for recovering vanadium component from the gasifier slag.

REFERENCE NUMERALS

| | |
|---|---|
| Pulverized slag | 2 |
| Alkali salt | 4 |
| Water | 6 |
| Slurry | 8 |
| Air | 10 |
| Roasted slag | 12 |
| Leaching | 14 |
| Filtration | 16, 26, 36 |
| Drying | 24, 34, 42 |

| | |
|---|---|
| Residue comprising iron | 20 |
| First Filtrate | 18 |
| Magnesium salt | 22 |
| Precipitate comprising magnesium silicate | 30 |
| Second filtrate | 28 |
| Ammonium salt | 32 |
| Precipitate comprising ammonium vanadate | 40 |
| Third filtrate comprising alkali rich solution | 38 |
| Iron component | 44 |
| Magnesium silicate | 46 |
| Vanadium pentoxide | 48 |

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

As described herein above, molten slag or gasifier slag which comes out as a byproduct from a gasifier after gasification comprises heavy metals, such as 1 to 10 wt. % of vanadium, 1 to 3 wt % of nickel, 1 to 10 wt. % of iron, 10 to 30 wt. % of silica and the like, which have high commercial value. It is therefore essential to extract the heavy metals from the slag. Vanadium is an important by-product, which has application in pharmaceutical products, catalyst as well as other fine chemicals in oxide form.

The present disclosure, therefore, provides a process to extract or recover a significant amount of vanadium component from gasifier slag comprising the vanadium component.

The process is described with reference to FIG. 1.

The slag is pulverized to a particle size less than 100 μm, preferably less than 75 μm to obtain pulverized slag (2). The step of pulverizing the slag to the particle size less than 100 μm increases the surface area of the slag particles which in turn provides a significant interaction of the alkali salt (4) with the vanadium component in the slag.

Typically, the slag comprises 1 to 10 wt. % of vanadium component (V); 1 to 10 wt. % of iron component (Fe); 10 to 40 wt. % of aluminium component (Al); 10 to 50 wt. % of silica component (Si); 5 to 20 wt. % of calcium component (Ca); 0.5 to 5 wt. % of nickel component (Ni); 1 to 5 wt. % of magnesium component (Mg); and 1 to 5 wt. % of sulphur component (S).

The pulverized slag (2) is blended with water (6) and an alkali salt (4) to obtain slurry (8). In accordance with one embodiment of the present disclosure, the slag and the alkali salt (4) are pulverized to produce a dry mixture of salt and slag which is used as a raw material for further roasting process. The alkali salt (4) is at least one selected from sodium carbonate ($Na_2CO_3$) and sodium sulphate ($Na_2SO_4$). The amount of the alkali salt is in the range of 20 wt % to 50 wt % of the total slag. In accordance with the present disclosure, the lower amount of alkali, typically lower than 20 wt % leads to lower extraction of metals from slag.

The slurry (8) is dried (12a) at 100° C. to 130° C. to remove water therefrom and then roasted in the presence of air (10) and at a temperature in the range of 750° C. and 1000° C. to obtain roasted slag (12b). Particularly, the roasting of the slurry (8) is carried out at a temperature close to the melting point of the alkali salt (4) (typically in the range of 850° C. and 950° C.). This ensures the availability of the alkali salt (4) for the reaction with vanadium component that is present in the slurry (8). Typically, the process step of roasting can be carried out for a time period in the range of 30 minutes to 360 minutes.

The roasted slag (12b) is leached (14) with water at a temperature in the range of 70° C. to 90° C. to obtain first filtrate comprising vanadium component and a residue (20). The step of leaching the roasted slag with water helps in extracting the vanadium component in the liquid form from roasted slag (solid). The leaching step is carried out at a temperature below the boiling point of water in order to avoid the loss of water and further re-precipitation of solubilized compounds.

The ratio of water to the roasted slag in the present step can be in the range of 1:1 to 5:1. Typically, the water used in the present step is de-ionized water. The step of leaching (14) is carried out for a time period in the range of 30 minutes to 360 minutes.

The residue (20) is separated by filtration (16) to obtain the first filtrate (18) comprising vanadium component. The pH of the first filtrate varies from 9 to 11.5.

In accordance with an embodiment, the residue (20) is dried (24) and further subjected to magnetic separation to obtain iron component (44).

The silica component is separated from the first filtrate using a magnesium salt. In accordance with the embodiments of the present disclosure, the first filtrate is reacted with magnesium salt (22) at a temperature in the range of 30° C. to 50° C. to obtain magnesium silicate in the form of a precipitate.

Typically, the temperature is maintained less than 50° C. to avoid the dissolution of precipitated silica compounds in water. The step of treating the first filtrate with the magnesium salt is carried out for a time period in the range of 30 minutes to 360 minutes. The magnesium salt (22) is magnesium nitrate. The amount of the magnesium salt is in the range of 5 wt % to 20 wt % of the total slag. Typically, the pH of the first filtrate is maintained in the range of 9 to 10 to precipitate silica in the form of magnesium silicate. Either mineral acid or ammonia can be added to maintain the pH of the first filtrate in the range of 9 to 10.

The present disclosure provides an optimum pH of the first filtrate to ensure maximum precipitation of the silica component.

The precipitate comprising magnesium silicate (30) is separated by filtration (26) to obtain a second filtrate (28). The precipitate (30) is further dried (40) to evaporate the water content therefrom and to obtain a magnesium silicate (46). In an embodiment, the magnesium silicate is dried at a temperature in the range of 120° C. and 500° C.

In accordance with an embodiment, the second filtrate (28) is reacted with an ammonium salt (32) at a temperature in the range of 60° C. to 90° C. to obtain ammonium vanadate in the form of a precipitate. The temperature range of 75° C. to 85° C. ensures maximum extraction of vanadium component and also prevents decomposition of ammonium salt to liberate ammonia.

The reaction mixture is cooled to a temperature in the range of −2° C. and −10° C. for a time period in the range of 30 minutes to 360 minutes to ensure maximum precipitation of the vanadium component. The precipitate (40) is separated by filtration (36) to obtain a third filtrate comprising alkali rich solution (38) comprising precipitated vanadium component and a third filtrate (38). The precipitated vanadium compounds are in the form of the vanadium salts such as ammonium metavanadate. In an embodiment, the reaction of the second filtrate (28) with ammonium salt (32) is carried out for a time period in the range of 30 minutes to 360 minutes. The ammonium salt (32) is ammonium sulfate. In accordance with the present disclosure, the pH of the first filtrate is maintained in the range of 8 to 9. Either mineral acid or ammonia can be added to maintain the pH of the second filtrate in the range of 8 to 9. The present disclosure provides an optimum pH of the second filtrate to ensure maximum precipitation of the vanadium component.

The precipitate comprising vanadium component is dried (42) at a temperature in the range of 120° C. and 150° C. to remove water from the precipitated vanadium component and calcined in the presence of air at a temperature in the range of 400° C. and 600° CO to obtain vanadium pentoxide (48) and ammonia.

In accordance with the present disclosure, the yield of the vanadium pentaoxide is at least 50%. Typically, the purity of the vanadium pentaoxide is greater than 95%.

In accordance with one exemplary embodiment of the present disclosure the process comprises the following steps.

The gasifier slag is pulverized to a particle size of 75 µm to obtain pulverized slag. The pulverized slag is blended with water and 30 wt % sodium carbonate to obtain slurry. The slurry is roasted in the presence of air and at 900° C. to obtain a roasted slag. The roasted slag is leached with water to obtain a first filtrate comprising the vanadium component. The ratio of water to the roasted slag in the step of leaching is 3: 1.

A silica component present in the first filtrate is separated by reaction with 15 wt % of magnesium nitrate to obtain a second filtrate comprising the vanadium component.

The second filtrate is then reacted with 15 wt % of ammonium salt to obtain ammonium metavanadate in the form of a precipitate. The precipitated ammonium metavanadate is separated by filtration and calcined at 450° C. to obtain vanadium oxide having purity greater than 99%.

The process of the present disclosure ensures recycling of the water evaporated from the process steps of drying mentioned herein above to the process step of obtaining the slurry (8).

In an embodiment, all the intermediate streams such as evaporated water, and the third filtrate comprising alkali salt are recycled to reduce the amount of raw materials required in the entire process and to make the process economical.

The process of the present disclosure facilitates in recovering vanadium component in oxide form with higher purity, along with recovery of silica and iron components which come out from the gasifier after gasification.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Experiment 1: Recovery of Vanadium and Other Metals from Gasifier Slag

The gasification slag (petcoke fired gasifier slag) was pulverized to the size less than 75 microns to obtain pulverized slag. The composition of the slag is summarized in Table 1.

TABLE 1

| Element | V | Ni | Fe | Mg | Ca | S | Al | Si |
|---|---|---|---|---|---|---|---|---|
| wt. % | 4.2 | 0.4 | 3.5 | 2.4 | 11.1 | 5.7 | 6.6 | 16.8 |

100 gm of pulverized slag was soaked with 30 wt % of $Na_2CO_3$ and 30 ml of water to obtain slurry. 160 gm of the slurry was dried at 120° C. for 60 min and was roasted in the presence of air and at 850° C. for 40 minutes to obtain roasted slag.

The roasted slag was leached with de-ionized water at 80° C. for 60 minutes to obtain a first biphasic mixture which was filtered to obtain a first residue and a first filtrate comprising 50 wt % of vanadium component. In the step of leaching, the ratio of water to roasted slag was 3:1.

213 ml of the first filtrate was treated at 40° C. for 60 minutes by adding 15 wt % of magnesium nitrate in the first filtrate under stirring to obtain a second biphasic mixture which is filtered to obtain a second residue comprising precipitated silica component in the form of magnesium silicate. In the present step, the pH of the separated first filtrate was maintained at 10. The second residue comprising precipitated silica component was dried at 450° C. to obtain magnesium silicate.

200 ml of the separated silica free second filtrate was treated at 60° C. for 50 minutes with 15 wt % of ammonium sulphate in the first solution under stirring to obtain a third biphasic mixture. The pH of the separated second filtrate was maintained at 8.6. The third biphasic mixture was cooled to −5° C. for 2 hours to ensure complete precipitation of vanadium component in the form of ammonium metavanadate. The third biphasic mixture was filtered to separate the third residue comprising precipitated vanadium component therefrom, followed by drying the third residue at 120° C. and then calcining at 450° C. to obtain pure vanadium in oxide form ($V_2O_5$) and a third filtrate comprising $Na_2CO_3$. The solution was recycled in the process step of obtaining the slurry.

110 gm of the first residue was subjected to magnetic separation to obtain 4.4. gm of iron component (iron oxide) and a treated residue.

Experiment 2

Experiment 2 was carried out using similar procedure as described in experiment 1, except a lower amount of sodium carbonate was incorporated.

Experiment 3

Experiment 3 was carried out using similar procedure as described in experiment 1, except a higher amount of sodium carbonate was incorporated.

Experiment 4

Experiment 4 was carried out using similar procedure as described in experiment 1, except that the roasting was carried out at lower temperature than melting temperature of sodium salt.

Experiment 5

Experiment 5 was carried out using similar procedure as described in experiment 1, except that the roasting was carried out at higher temperature than melting temperature of sodium salt.

Experiment 6

Experiment 6 was carried out using similar procedure as described in experiment 1, except that the roasting was carried out at higher temperature than melting temperature of sodium salt.

The results of experiments 1-6 are summarized in Table 2 given below:

From table 2, it is evident that the yields of vanadium, silica and iron are dependent on the process parameters such as the amount of sodium salt, and roasting temperature of the slurry.

From experiments 2 and 3, it is evident that the amount of sodium salt affects the extraction of the metals from gasifier slag. The lower amount of sodium salt leads to reduced recovery of metals whereas the higher amount of sodium leads to increased recovery of metals from the gasifier slag.

From experiments 4 to 6, it is evident that the roasting temperature affects the extraction of the metals from gasifier slag. The lower temperature than melting temperature of the sodium salt leads to reduced recovery of metals whereas the higher temperature leads to increased recovery of metals from the gasifier slag.

Technical Advancements

The present disclosure described herein above has several technical advantages including, but not limited to, the realization of a process:

that is capable of recovering vanadium component with purity greater than 95% from the gasifier slag;

that is capable of recovering other valuable components such as iron, silica, alumina, sulfur, nickel, calcium and magnesium from the gasifier slag which comes out from the gasifier after gasification; and in which all the intermediate streams such as evaporated water and the final filtered solution comprising the alkali salt generated are collected and recycled in the same process so as to reduce the amount of raw materials.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is

TABLE 2

| Ex No | Amount of Alkali (wt %) | Roasting temp. (° C.) | Leaching temp. (° C.) | pH of first filtrate | Amount of Mg salt (wt %) | pH of second filtrate | Amount of ammonium salt (wt %) | Yield of silica comp. (gm) | Yield of iron comp. (gm) | Yield of vanadium oxide (gm) | Purity of vanadium oxide (%) |
|---|---|---|---|---|---|---|---|---|---|---|---|
| 1. | 30 | 850 | 80 | 10 | 10 | 8.6 | 10 | 3.7 | 2.5 (71%) | 5.5 (72%) | >99 |
| 2. | 15 | 850 | 80 | 10 | 10 | 8.6 | 10 | 2.8 | 1.8 (52%) | 3.8 (50%) | >99 |
| 3. | 45 | 850 | 80 | 10 | 10 | 8.6 | 10 | 4.6 | 3.1 (88%) | 5.7 (74%) | >99 |
| 4. | 30 | 800 | 80 | 10 | 10 | 8.6 | 10 | 3.0 | 1.9 (54%) | 3.6 (47%) | >99 |
| 5. | 30 | 900 | 80 | 10 | 10 | 8.6 | 10 | 4.8 | 3.0 (85%) | 6.1 (80%) | >99 |
| 6. | 30 | 950 | 80 | 10 | 10 | 8.6 | 10 | 4.9 | 3.0 (85%) | 5.2 (68%) | >99 |

The invention claimed is:

1. A process for obtaining vanadium oxide from gasifier slag having vanadium component; the process comprising the following steps:
   a) pulverizing the gasifier slag to a particle size less than 100 μm to obtain a pulverized slag;
   b) blending the pulverized slag with water and at least one alkali salt to obtain a slurry;
   c) drying the slurry to remove water therefrom;
   d) roasting the dried slurry in the presence of air and at a temperature in the range of 750° C. to 1000° C. to obtain a roasted slag;
   e) leaching the roasted slag with water to obtain a first filtrate comprising the vanadium component;
   f) separating a silica component from the first filtrate to obtain a second filtrate;
   g) reacting the second filtrate with an ammonium salt to obtain ammonium metavanadate, in the form of a precipitate, and a third filtrate; and
   h) separating the precipitate of ammonium metavanadate and calcining the precipitate of ammonium metavanadate at a temperature in the range of 400 to 600° C. to obtain vanadium oxide having purity greater than 95 wt %.

2. The process as claimed in claim 1, wherein in the step (b) the alkali salt is at least one selected from the group consisting of sodium carbonate ($Na_2CO_3$) and sodium sulphate ($Na_2SO_4$) and the amount of the alkali salt is in the range of 20 wt % to 50 wt % of the total slag.

3. The process as claimed in claim 1, wherein in the step (b) the alkali salt is sodium carbonate ($Na_2CO_3$) and the amount of the alkali salt is in the range of 30 wt % to 45 wt % of the total slag.

4. The process as claimed in claim 1, wherein the step (c) of drying the slurry is carried out at a temperature in the range of 100° C. to 130° C.

5. The process as claimed in claim 1, wherein the step (d) of roasting the dried slurry is carried out at a temperature in the range of 850° C. to 950° C.

6. The process as claimed in claim 1, wherein the process step (e) comprises leaching the roasted slag at a temperature in the range of 70° C. to 90° C. to obtain a first filtrate comprising vanadium component and a residue comprising iron component.

7. The process as claimed in claim 1, wherein in the step (e) the ratio of the water to the roasted slag is in the range of 1:1 to 5:1.

8. The process as claimed in claim 6 further comprises drying the residue and subjecting the dried residue to magnetic separation to obtain iron component.

9. The process as claimed in claim 1, wherein said separation of silica component in the process step (f) is carried out by reacting the first filtrate with a magnesium salt at a temperature in the range of 30° C. to 50° C. to obtain magnesium silicate in the form of a precipitate; followed by separating magnesium silicate by filtration to obtain the second filtrate comprising the vanadium component.

10. The process as claimed in claim 9, wherein in the step (f) the magnesium salt is magnesium nitrate and the amount of the magnesium salt is in the range of 5 wt % to 20 wt % of the total slag.

11. The process as claimed in claim 9, wherein in the process step (f), the pH of the first filtrate is maintained in the range of 9 to 10.

12. The process as claimed in claim 1, wherein the reaction in the process step (g) is carried out at a temperature in the range of 60° C. to 90° C., followed by cooling to a temperature in the range of −2° C. to −10° C. to obtain ammonium metavanadate in form of the precipitate and the third filtrate comprising alkali solution.

13. The process as claimed in claim 1, wherein in the step (g) the ammonium salt is ammonium sulphate and the amount of the ammonium salt is in the range of 5 wt % to 20 wt % of the total slag.

14. The process as claimed in claim 1, wherein in the process step (g), the pH of the second filtrate is maintained in the range of 8 to 9.

15. The process as claimed in claim 1, wherein the process step (h) comprises separating the ammonium metavanadate by filtration to obtain the third filtrate comprising alkali solution and recycling the alkali solution.

16. A process for obtaining vanadium oxide from gasifier slag having vanadium component, the process comprising the following steps:
   a. pulverizing the gasifier slag to a particle size of 75 μm to obtain pulverized slag;
   b. blending the pulverized slag with water and sodium carbonate to obtain a slurry; wherein the amount of sodium carbonate is 30 wt % of the total slag;
   c. drying the slurry at temperature of 120° C. to remove water therefrom;
   d. roasting the slurry in the presence of air, at 900° C. to obtain a roasted slag;
   e. leaching the roasted slag with water to obtain a first filtrate comprising the vanadium component; wherein the ratio of water to the roasted slag is 3:1;
   f. separating a silica component from the first filtrate using magnesium nitrate to obtain a second filtrate; wherein the amount of magnesium nitrate is 15 wt % of the total slag;
   g. reacting the second filtrate with an ammonium sulphate to obtain ammonium metavanadate in the form of a precipitate; wherein the amount of ammonium sulphate is 15 wt % of the total slag; and
   h. separating the precipitate and calcining at 450° C. to obtain vanadium oxide having purity greater than 99%.

* * * * *